United States Patent
Takiguchi et al.

(10) Patent No.: US 12,416,527 B2
(45) Date of Patent: Sep. 16, 2025

(54) RADIATION THERMOMETER

(71) Applicant: HORIBA, Ltd., Kyoto (JP)

(72) Inventors: Yu Takiguchi, Kyoto (JP); Sho Fujino, Kyoto (JP)

(73) Assignee: HORIBA, LTD., Kyoto (JP)

(*) Notice: Subject to any disclaimer, the term of this patent is extended or adjusted under 35 U.S.C. 154(b) by 449 days.

(21) Appl. No.: 17/999,015

(22) PCT Filed: Jun. 23, 2021

(86) PCT No.: PCT/JP2021/023721
§ 371 (c)(1),
(2) Date: Nov. 16, 2022

(87) PCT Pub. No.: WO2022/004507
PCT Pub. Date: Jan. 6, 2022

(65) Prior Publication Data
US 2023/0194350 A1    Jun. 22, 2023

(30) Foreign Application Priority Data

Jun. 29, 2020 (JP) .................................. 2020-111469

(51) Int. Cl.
*G01J 5/02* (2022.01)
*G01J 5/00* (2022.01)
(Continued)

(52) U.S. Cl.
CPC .......... *G01J 5/0215* (2013.01); *G01J 5/0007* (2013.01); *G01J 5/04* (2013.01); *G01J 5/0802* (2022.01); *G01J 5/0806* (2013.01)

(58) Field of Classification Search
CPC .......... G01J 5/0215; G01J 5/0007; G01J 5/04; G01J 5/0802; G01J 5/0806; G01J 5/06; G01J 5/02; G01J 5/00
See application file for complete search history.

(56) References Cited

U.S. PATENT DOCUMENTS 5,512,748 A * 4/1996 Hanson ..................... G01J 5/10
                                                           250/331
7,402,802 B1   7/2008 Terre et al.
(Continued)

FOREIGN PATENT DOCUMENTS

CN    107709943 A * 2/2018 ............ G01J 5/0022
CN    109405978 A    3/2019
(Continued)

OTHER PUBLICATIONS

European Patent Office, Extended European Search Report Issued in Application No. 21832673.4, Mar. 22, 2024, Germany, 15 pages.
(Continued)

*Primary Examiner* — Laura Martin
*Assistant Examiner* — Julia Fitzpatrick
(74) *Attorney, Agent, or Firm* — Alleman Hall & Tuttle LLP (57) ABSTRACT

The present invention downsizes a radiation thermometer and increases a circuit scale, and includes: an infrared sensor; a signal processing unit that processes a signal of the infrared sensor; and a casing that accommodates the infrared sensor and the signal processing unit, in which the signal processing unit is configured by stacking a plurality of substrates with a spacer interposed therebetween.

7 Claims, 7 Drawing Sheets

(51) Int. Cl.
*G01J 5/04* (2006.01)
*G01J 5/0802* (2022.01)
*G01J 5/0806* (2022.01)

(56) References Cited

U.S. PATENT DOCUMENTS

| | | | |
|---|---|---|---|
| 10,309,670 B2* | 6/2019 | Kusukame | ............... F24F 11/46 |
| 2006/0153273 A1 | 7/2006 | Torii et al. | |
| 2012/0298867 A1 | 11/2012 | Nishikawa et al. | |
| 2017/0223245 A1 | 8/2017 | Park | |
| 2018/0077754 A1* | 3/2018 | Ito | ........................... G01J 5/602 |
| 2019/0310138 A1* | 10/2019 | Fujino | ................... G01J 1/0411 |

FOREIGN PATENT DOCUMENTS

| | | | | | |
|---|---|---|---|---|---|
| DE | 19535408 | A1 | * | 3/1997 | ............... G01J 5/04 |
| DE | 19842403 | A1 | * | 3/2000 | ............... G01J 5/02 |
| DE | 19600334 | C2 | * | 11/2002 | ............... G01J 5/02 |
| JP | S62182426 | U | | 11/1987 | |
| JP | 2003188489 | A | | 7/2003 | |
| JP | 2006215012 | A | * | 8/2006 | ............... G01J 5/02 |
| JP | 2006226864 | A | | 8/2006 | |
| JP | 2007225455 | A | | 9/2007 | |
| JP | 2008187284 | A | | 8/2008 | |
| JP | 2009002739 | A | | 1/2009 | |
| JP | 2019100987 | A | | 6/2019 | |
| KR | 20010005869 | | * | 1/2001 | |
| WO | WO-2007061137 | A1 | * | 5/2007 | .............. G01J 5/045 |

OTHER PUBLICATIONS

ISA Japan Patent Office, International Search Report Issued in Application No. PCT/JP2021/023721, Sep. 21, 2021, WIPO, 6 pages.

\* cited by examiner

RADIATION THERMOMETER

TECHNICAL FIELD

The present invention relates to a radiation thermometer.

BACKGROUND ART

As disclosed in Patent Literature 1, the radiation thermometer is configured to detect infrared rays emitted from a measurement target with an infrared detection element (infrared sensor) so as to be able to measure the temperature of the measurement target based on the detected intensity.

This radiation thermometer includes a measurement unit configured by accommodating an infrared sensor in a casing, and the measurement unit is desired to be downsized due to restrictions on an installation place and the like. Therefore, the casing of the measurement unit is usually configured to accommodate only the infrared sensor or to accommodate the infrared sensor and a preamplifier substrate. In addition, a calculation unit is connected to the measurement unit of the radiation thermometer via an electric cable, and the calculation unit is configured to calculate a temperature from an analog signal output from the measurement unit.

However, as described above, when the measuring unit is downsized, only a minimum circuit can be accommodated in the casing. In addition, when the minimum circuit is accommodated in the casing, an analog signal from the infrared sensor is output to the outside, and the configuration is weak against electromagnetic noise (EMC noise).

CITATION LIST

Patent Literature

Patent Literature 1: JP 2019-100987 A

SUMMARY OF INVENTION

Technical Problem

Therefore, the present invention has been made to solve the above problems, and a main object of the present invention is to downsize a radiation thermometer and to increase a circuit scale.

Solution to Problem

That is, a radiation thermometer according to the present invention includes: an infrared sensor; a signal processing unit that processes a signal of the infrared sensor; and a casing that accommodates the infrared sensor and the signal processing unit, in which the signal processing unit is configured by stacking a plurality of substrates with a spacer interposed therebetween.

With such a configuration, since the signal processing unit is configured by stacking the plurality of substrates with the spacer interposed therebetween, the signal processing unit can be downsized and the circuit scale can be increased. As a result, the degree of freedom of the circuit accommodated in the casing can be increased, and an analog signal from the infrared sensor can be converted into a digital signal in the same casing as the infrared sensor. Therefore, a digital signal can be output from the casing, and the configuration is resistant to electromagnetic noise.

Even in a case where the plurality of substrates are connected by an electric cable, the influence of electromagnetic noise is exerted. Therefore, it is desirable that the plurality of substrates be connected using an inter-substrate connector. Further, by connecting the plurality of substrates by the inter-substrate connector, connection between the substrates can be simplified.

When a plurality of stacked substrates are fixed by screwing or the like, an excessive stress is applied to the substrates, and the plurality of substrates cannot be stably fixed. Therefore, it is desirable that the plurality of substrates be fixed to the casing with an elastic member interposed therebetween.

When the plurality of substrates are connected by the inter-substrate connector, it is necessary to fix the inter-substrate connector so that the inter-substrate connector does not come off. Therefore, it is desirable that the elastic member press the plurality of substrates from a direction in which the plurality of substrates are stacked. With this configuration, the plurality of substrates can be stably fixed without coming off of the inter-substrate connector.

In the present invention, it is conceivable that the infrared sensor is mounted on, for example, a first substrate located on an outermost side among the plurality of substrates. In the case of this configuration, the heat generated in the substrate is transmitted to the infrared sensor, and the output of the infrared sensor drifts. In order to suitably solve this problem, it is desirable that the first substrate be provided in contact with the casing or provided with a heat dissipation member interposed between the first substrate and the casing. With this configuration, the heat generated in the substrate can be released to the casing, so that the drift of the output of the infrared sensor can be reduced.

In order to accurately measure the temperature of a measurement target, it is desirable that the radiation thermometer further include a lens provided in front of the infrared sensor.

Here, in a case where the infrared sensor and the lens are accommodated in the same casing, it is necessary to take measures such as uniformizing the temperature distribution of the casing in order to cancel the thermal influence of the optical system such as the lens on the infrared sensor.

Therefore, in the present invention, it is desirable that the casing include a first casing portion that accommodates the infrared sensor and the signal processing unit, and a second casing portion that accommodates the lens, and that the first casing portion and the second casing be configured to be separable from each other. With this configuration, since the first casing portion and the second casing portion are divided and thermally separated, the influence of the optical system such as the lens on the infrared sensor can be reduced.

Here, when the infrared sensor detects thermal radiation from the second casing, a measurement error occurs. In order to reduce this measurement error, it is desirable that the first casing portion include a diaphragm portion that is provided in front of the infrared sensor and block heat radiation from the second casing portion. In addition, it is desirable that an inner diameter of the diaphragm portion be a diameter that blocks thermal radiation from the second casing portion without blocking infrared rays from a measurement target incident on the infrared sensor through the lens.

In order to improve the measurement accuracy by the infrared sensor, it is conceivable to provide a wavelength selection filter in front of the infrared sensor. When the wavelength selection filter is provided in the second casing portion, the temperature difference between the infrared sensor and the wavelength selection filter increases, and the influence of the infrared light emitted from the wavelength selection filter is given. Therefore, it is desirable that the first casing portion include a wavelength selection filter provided in front of the infrared sensor. By providing the wavelength selection filter in the first casing portion in this manner, a temperature difference between the infrared sensor and the wavelength selection filter can be reduced, and a measurement error due to infrared rays emitted from the wavelength selection filter can be reduced.

In order to be replaceable with various lenses according to the application of the radiation thermometer, it is desirable that the second casing portion include a lens block that holds the lens, and the lens block be configured to be replaceable.

Advantageous Effects of Invention

According to the present invention described above, the radiation thermometer can be downsized and the circuit scale can be increased.

LIST OF REFERENCE CHARACTERS 100 radiation thermometer
2 infrared sensor
3 lens
4 signal processing unit
41 first substrate
42 second substrate
43 third substrate
44 fourth substrate
45 spacer
46 inter-substrate connector
5 casing
51 first casing portion
52 second casing portion
521 lens block
7 elastic member
8 heat dissipation member
9 diaphragm portion
10 wavelength selection filter

DESCRIPTION OF EMBODIMENTS

Hereinafter, a radiation thermometer according to an embodiment of the present invention will be described with reference to the drawings.

<Device Configuration of Radiation Thermometer>

A radiation thermometer 100 according to the present embodiment measures a temperature of a measurement target in a non-contact manner based on the intensity of infrared rays emitted from the measurement target.

Specifically, the radiation thermometer 100 includes an infrared sensor 2, a lens 3 provided in front of an incident side that is a measurement target side of the infrared sensor 2, a signal processing unit 4 that processes a signal of the infrared sensor 2 to calculate a temperature, and a casing 5 that accommodates the infrared sensor 2 and the signal processing unit 4. Note that the temperature data calculated by the signal processing unit 4 is output to an external device (not illustrated) such as an external display unit 200 or a temperature control device via an electric cable 6.

The infrared sensor 2 detects infrared rays emitted from a measurement target and outputs an intensity signal (analog signal) corresponding to energy of the detected infrared rays. Specifically, the infrared sensor 2 detects infrared rays in the entire wavelength band of the infrared wavelength band, for example, and is a thermal-type sensor such as a thermopile here. As the infrared sensor, other types, for example, quantum photoelectric elements such as HgCdTe, InGaAs, Ines, and PbSe may be used. Furthermore, the infrared sensor 2 is provided with a wavelength selection filter (not illustrated) that passes only light (electromagnetic wave) in a predetermined wavelength band. Here, for example, one that passes only infrared rays in a band with a wavelength of 8 μm to 14 μm is used, and only infrared rays that have passed through the wavelength selection filter 10 are received.

The lens 3 is an infrared lens that condenses infrared rays emitted from a measurement target on the infrared sensor 2. In the present embodiment, a plano-convex lens in which one surface is a convex surface and the other surface is a flat surface is used. In addition, the lens 3 has a circular shape in plan view. Note that the lens 3 may be a biconvex lens having convex surfaces on both sides, or the shape and size may be appropriately changed.

The signal processing unit 4 processes the analog signal of the infrared sensor 2 and calculates the temperature of the measurement target. The signal processing unit 4 includes an amplification unit 4a that amplifies an analog signal of the infrared sensor 2, an AD conversion unit 4b that converts the amplified analog signal into a digital signal, a temperature calculation unit 4c such as a CPU that calculates a temperature from the AD-converted digital signal, and an input/output interface unit 4d that outputs temperature data (digital signal) indicating the calculated temperature to the outside.

The casing 5 accommodates the infrared sensor 2, the signal processing unit 4, and the lens 3, and has a substantially cylindrical shape. The casing 5 includes a first casing portion 51 that accommodates the infrared sensor 2 and the signal processing unit 4, and a second casing portion 52 that accommodates the lens 3. The first casing portion 51 and the second casing portion 52 are desirably made of a material having high thermal conductivity, such as aluminum or copper.

Figure 1:
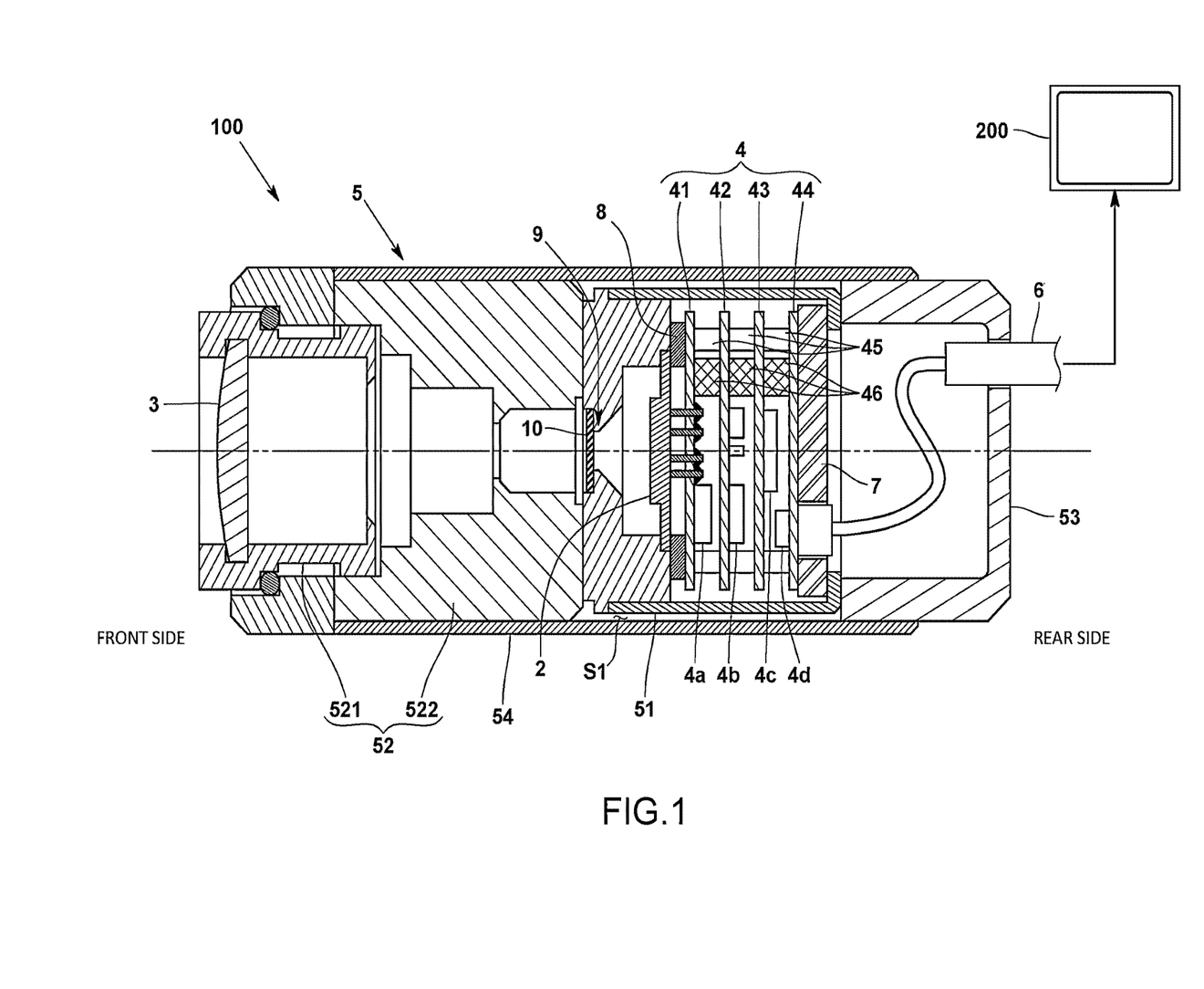
FIG. 1 is a diagram schematically illustrating a configuration of a radiation thermometer according to an embodiment of the present invention.

Thus, as illustrated in FIG. 1, the signal processing unit 4 of the present embodiment is configured by stacking a plurality of substrates 41 to 44 in the thickness direction with spacers 45 interposed therebetween. In the present embodiment, a four-stage configuration in which four substrates 41 to 44 are stacked with the spacers 45 interposed therebetween is employed.

The infrared sensor 2 is soldered and mounted on the upper surface of the first substrate 41 located at the uppermost stage (foremost side in FIG. 1) which is the outermost side. In addition, the first substrate 41 is provided with an amplification unit 4a that amplifies an analog signal of the infrared sensor 2. Here, since the infrared sensor 2 is mounted on the upper surface of the first substrate 41, the amplification unit 4a is provided on the back surface of the first substrate 41.

On the second substrate 42 next to the first substrate 41, an AD conversion unit 4b that converts the analog signal amplified by the amplification unit 4a into a digital signal is mounted. In FIG. 1, the AD conversion unit 4b is mounted on the back surface of the second substrate 42 so as not to physically interfere with the amplification unit 4a, but may be provided on the upper surface of the second substrate 42.

Furthermore, the third substrate 43 next to the second substrate 42 is provided with a temperature calculation unit 4c such as a CPU that calculates a temperature from the converted digital signal. In FIG. 1, the temperature calculation unit 4c is mounted on the back surface of the third substrate 43 so as not to physically interfere with the AD conversion unit 4b, but may be provided on the upper surface of the third substrate 43.

Further, thereon, the fourth substrate 44 next to the third substrate 43 is provided with an input/output interface unit 4d for outputting the temperature data calculated by the temperature calculation unit 4c to the outside. The electric cable 6 connected to an external device via a connector is connected to the fourth substrate 44.

These substrates 41 to 44 are separated by a predetermined distance by the spacer 45. The spacer may be, for example, copper plated with tin or aluminum plated with tin. One or a plurality of spacers 45 are provided between the substrates adjacent to each other. The spacers 45 prevent the electronic components 4a to 4d mounted on the respective substrates 41 to 44 from physically interfering with another substrate or an electronic component mounted on another substrate.

Figure 2:
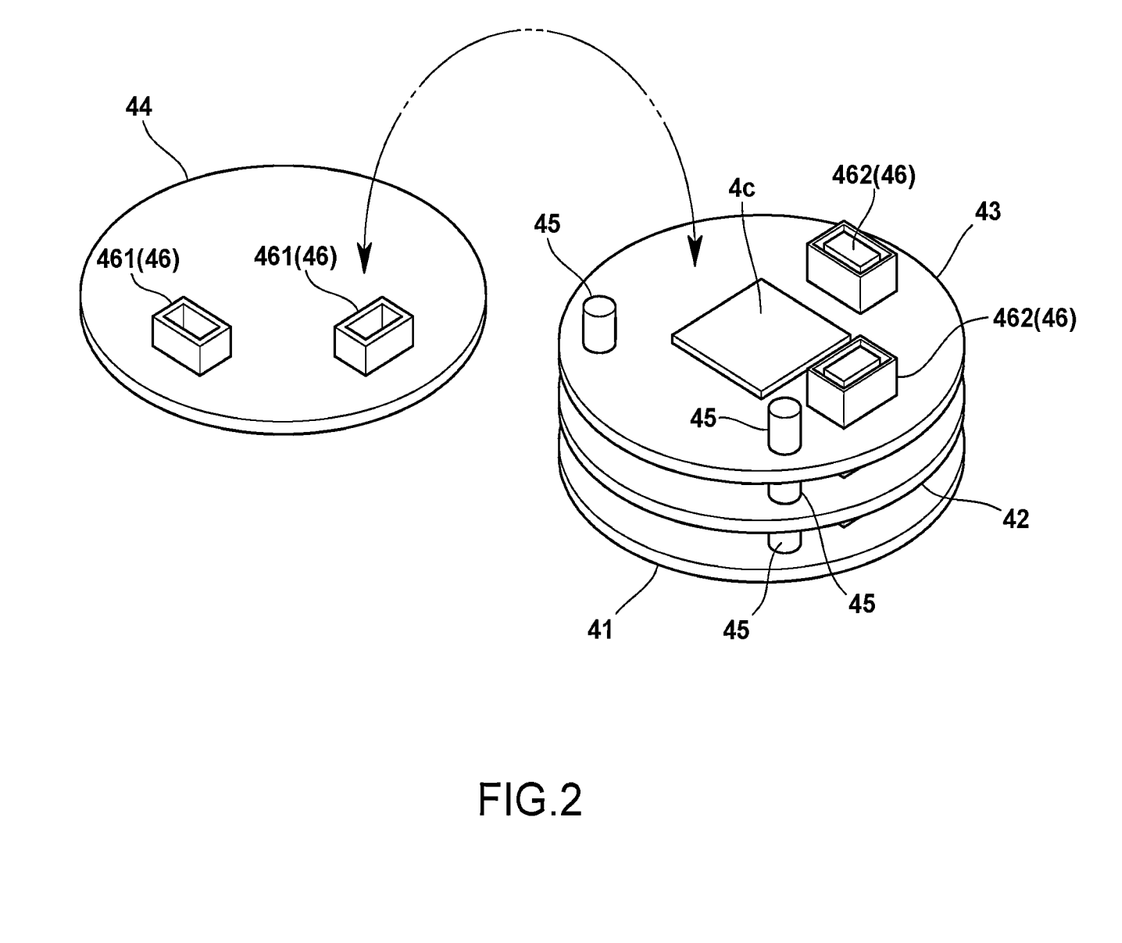
FIG. 2 is a perspective view illustrating a state in which a fourth substrate is separated from a third substrate in the embodiment.

Further, these substrates 41 to 44 are connected using inter-substrate connectors 46. The inter-substrate connector 46 is of a fitting type and is vertically connected. Specifically, as illustrated in FIG. 2, the inter-substrate connector 46 includes a plug 461 provided on one of opposing surfaces of two boards adjacent to each other, and a receptacle 462 provided on the other. Note that the inter-substrate connector 46 also has a function similar to that of the spacer 45 described above, and causes the substrates 41 to 44 to be separated from each other by a predetermined distance.

The plurality of substrates 41 to 44 constituting the signal processing unit 4 are fixed to the casing 5 (here, the first casing portion 51) via an elastic member 7 such as silicone rubber. Specifically, the elastic member 7 is interposed between the first casing portion 51 and the plurality of substrates 41 to 44 to press the plurality of substrates 41 to 44 from a direction in which the plurality of substrates 41 to 44 are stacked (front-rear direction in FIG. 1). In the present embodiment, the elastic member 7 is provided between the fourth substrate 44 opposite to the first substrate 41 on which the infrared sensor 2 is mounted and the first casing portion 51.

Here, a heat dissipation member 8 is provided between the first substrate 41 and the first casing portion 51. That is, the heat dissipation member 8 is provided in contact with the first substrate 41, and the heat dissipation member 8 is provided in contact with the first casing portion 51. Note that, in relation to the elastic member 7 described above, the plurality of substrates 41 to 44 have a structure sandwiched between the elastic member 7 and the heat dissipation member 8. The first substrate 41 may be brought into direct contact with the first casing portion 51 without providing the heat dissipation member 8.

Figure 3:
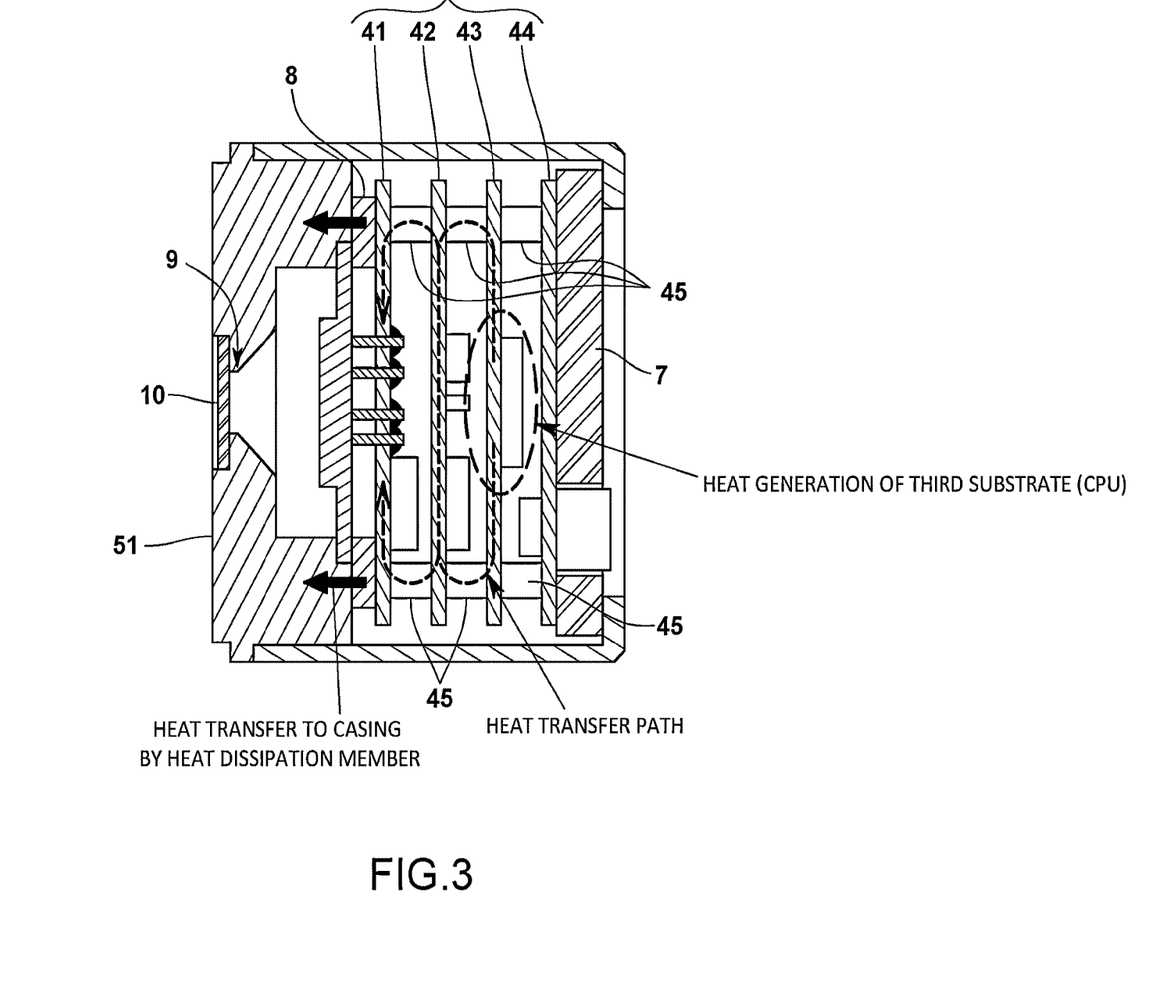
FIG. 3 is a schematic diagram illustrating a flow of heat of the embodiment.
Figure 4:
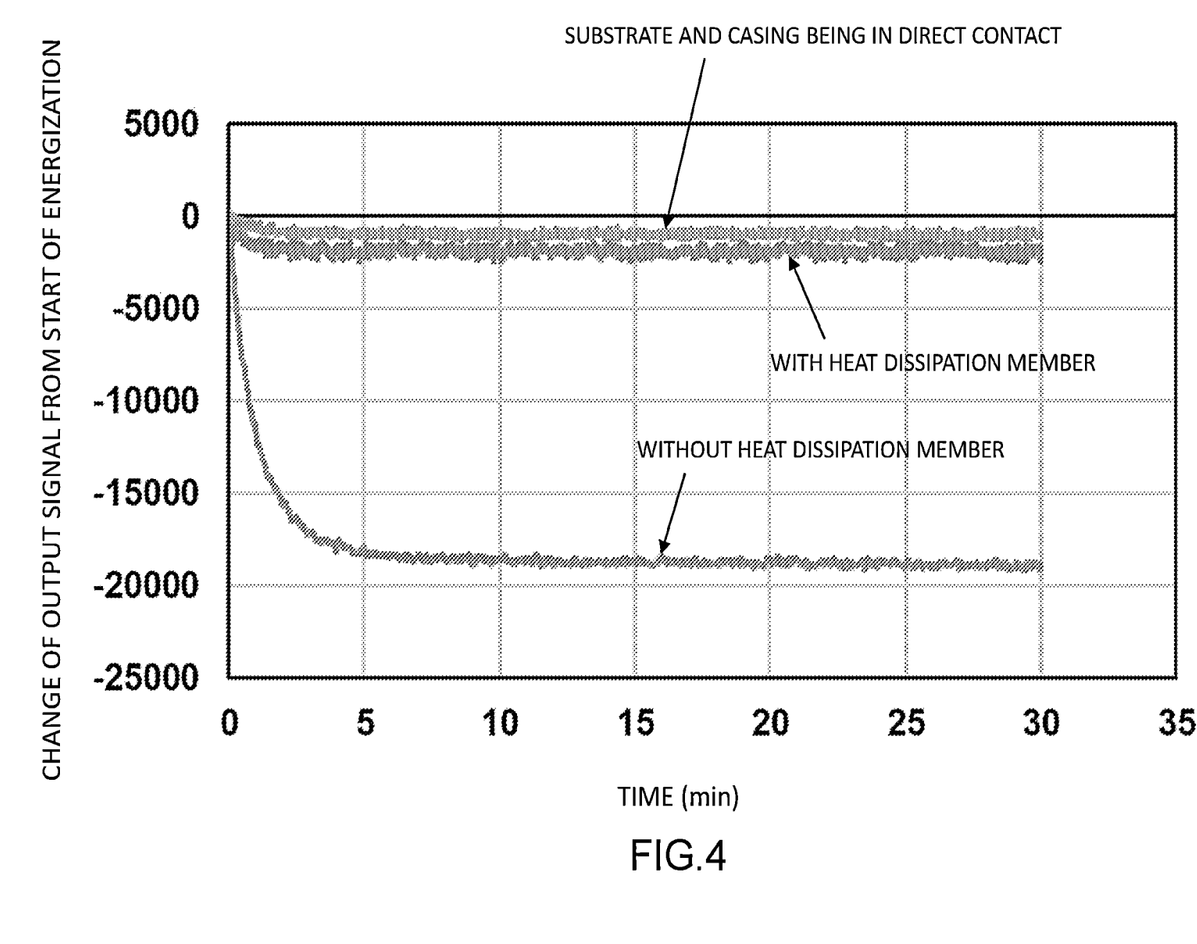
FIG. 4 is an experimental result showing the presence or absence of a heat dissipation member and a time change in an output signal of an infrared sensor in a case where a substrate and a casing are in direct contact with each other.

The heat dissipation member 8 is, for example, an acrylic or silicone-based sheet. The heat dissipation member 8 releases the heat generated in the substrates 41 to 44 to the first casing portion 51, thereby reducing the temperature drift of the infrared sensor 2. The heat dissipation member 8 is provided so as to surround the infrared sensor 2 on the first substrate 41. Among the electronic components mounted on the plurality of substrates 41 to 44, the heat generation of the temperature calculation unit (CPU) 4c is large, and as illustrated in FIG. 3, the heat from the third substrate 43 on which the temperature calculation unit 4c is mounted is transferred mainly to the first substrate 41 side with the spacers 45 interposed therebetween. The heat transferred to the first substrate 41 is transferred to the first casing portion 51 via the heat dissipation member 8. As described above, the heat generated in the substrates 41 to 44 is released to the first casing portion 51 by the heat dissipation member 8, whereby the temperature drift of the infrared sensor 2 can be reduced as shown in FIG. 4. The temperature drift of the infrared sensor 2 can also be reduced by bringing the first substrate 41 into direct contact with the first casing portion 51. FIG. 4 is an experimental result showing a change in the output signal of the infrared sensor 2 in a case where the heat dissipation member 8 is not used and the place of the heat dissipation member 8 is a heat insulating layer, in a case where the heat dissipation member 8 is used, and in a case where the first substrate 41 is directly brought into contact with the first casing portion 51 and fixed with screws without using the heat dissipation member 8.

The first casing portion 51 and the second casing portion 52 constituting the casing 5 are separated from each other. Specifically, the first casing portion 51 and the second casing portion 52 may be formed of different members, and the first casing portion 51 and the second casing portion 52 may be formed of materials having different thermal conductivities. In addition, the front end surface of the first casing portion 51 and the rear end surface of the second casing portion 52 are connected so as to abut on each other. Here, the connection is made using a screw (not illustrated). A third casing 53 from which the electric cable 6 extends is connected to a rear end surface of the first casing portion 51. In addition, the outer peripheral surfaces of the first casing portion 51 and the second casing portion 52 are covered with a fourth casing portion 54, and here, a cylindrical gap S1 is formed between the fourth casing portion 54 and the first casing portion 51. The gap S1 functions as a heat insulating layer.

Figure 5:
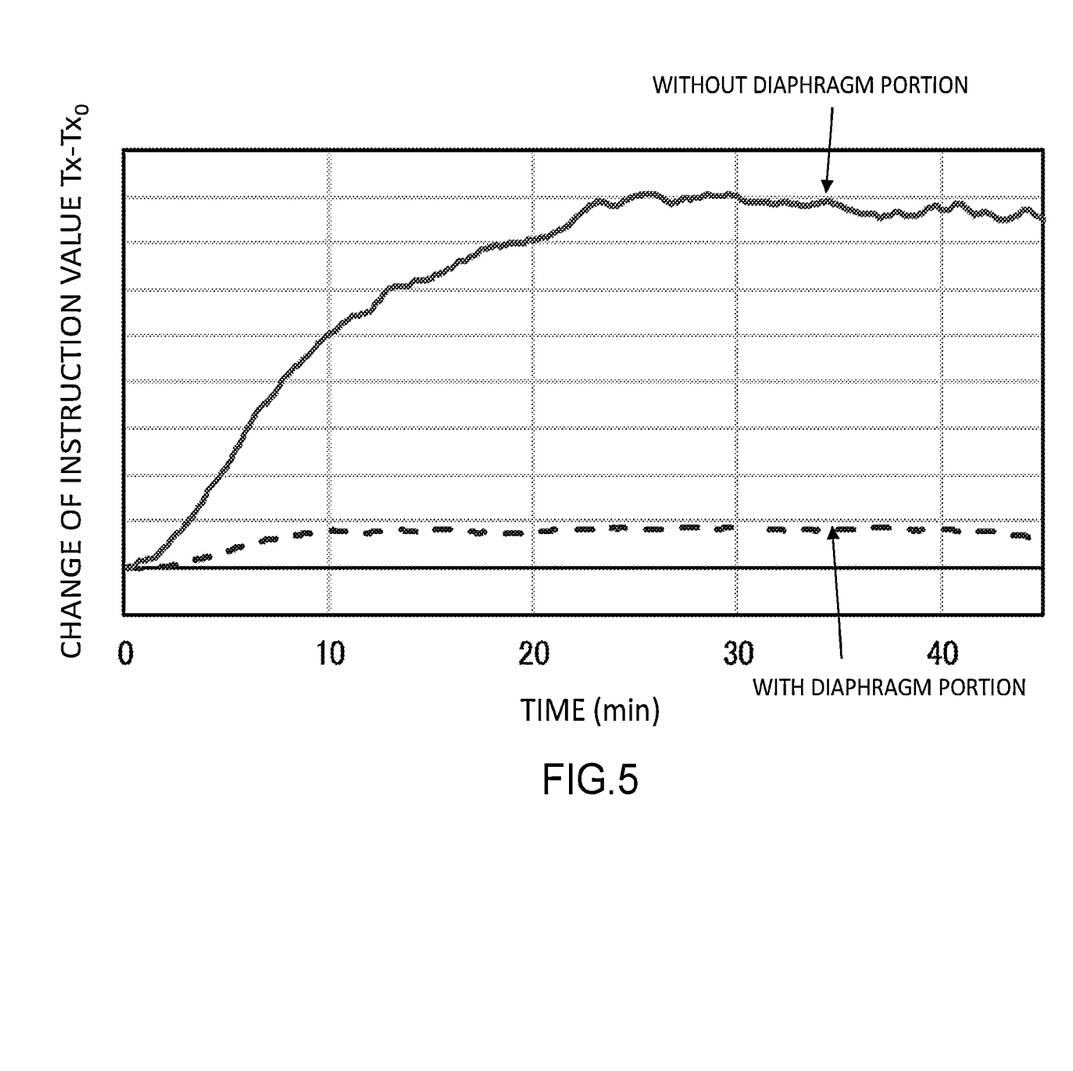
FIG. 5 is an experimental result showing a time change of a measured value (instruction value) depending on the presence or absence of a diaphragm portion.

The first casing portion 51 is provided with a diaphragm portion 9 that is provided in front of the incident side which is the measurement target side of the infrared sensor 2 and blocks heat radiation from the second casing portion 52. The diaphragm portion 9 forms a circular opening, and is formed on the front end side of the first casing portion 51. The diaphragm portion 9 can reduce thermal radiation from the second casing portion 52 incident on the infrared sensor 2. As a result, as shown in FIG. 5, it is possible to prevent deterioration of the measured value (instruction value) due to temperature influence caused by separation of a sensor unit (the first casing portion 51 accommodating the infrared sensor 2) and a lens unit (the second casing portion 52 accommodating the lens 3). FIG. 5 is an experimental result showing a time change of the measured value (instruction value) in a case where the diaphragm portion 9 is not provided and a case where the diaphragm portion 9 is provided.

Figure 6:
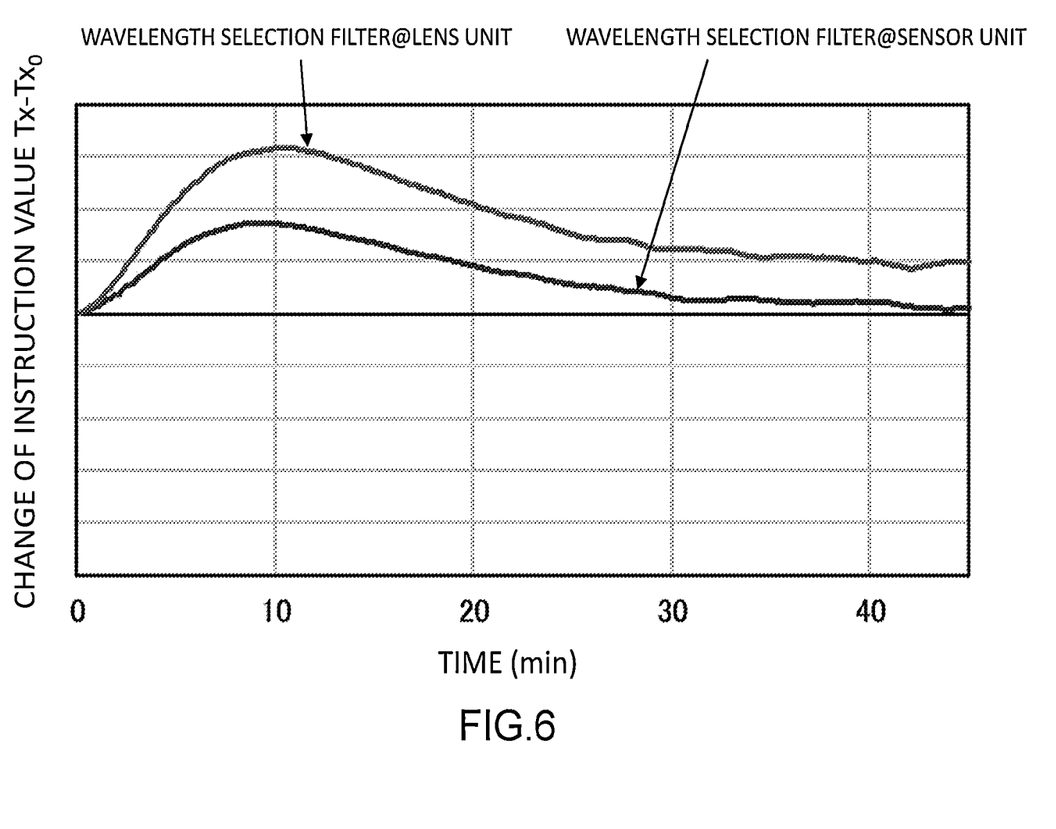
FIG. 6 is an experimental result showing a time change of a measured value (instruction value) in a case where a wavelength selection filter is provided in a lens unit and in a case where the wavelength selection filter is provided in a sensor unit.

In the first casing portion 51, a second wavelength selection filter 10 is provided in front of the incident side which is the measurement target side of the infrared sensor 2. The second wavelength selection filter 10 cuts transmission of wavelength bands other than the measurement wavelength that cannot be cut by the wavelength selection filter provided in the infrared sensor 2. Specifically, the second wavelength selection filter 10 is provided on the front side of the diaphragm portion 9 in the first casing portion 51. By providing the second filter 10 in the first casing portion 51 in this manner, as shown in FIG. 6, as compared with the case where the second filter is provided in the second casing portion 52 (lens unit), it is possible to reduce the temperature difference between the infrared sensor 2 and the second wavelength selection filter 10 and to prevent deterioration of the measured value (instruction value) due to the temperature influence. Note that the second wavelength selection filter 10 may not be provided.

On the other hand, the second casing portion 52 includes a lens block 521 that holds the lens 3, and a casing main body 522 to which the lens block 521 is attached and detached, and the lens block 521 is configured to be replaceable with respect to the casing main body 522. The lens block 521 is prepared such that the length of the optical system and the type of the lens 3 are different according to the visual field characteristic, and is attached to the casing main body 522 according to the use of the radiation thermometer 100.

Effects of Present Embodiment

According to the radiation thermometer 100 of the present embodiment, since the signal processing unit 4 is configured by stacking the plurality of substrates 41 to 44 with the spacers 45 interposed therebetween, the signal processing unit 4 can be downsized and the circuit scale can be increased. As a result, the degree of freedom of the circuit accommodated in the casing 5 can be increased, and the analog signal from the infrared sensor 2 can be converted into the digital signal in the same casing 5 as the infrared sensor 2. Therefore, a digital signal can be output from the casing 5, and the configuration is resistant to electromagnetic noise.

Other Modified Embodiments

Note that the present invention is not limited to the above embodiment.

For example, the signal processing unit 4 of the above embodiment is configured using the four substrates 41 to 44, but may be configured by stacking two or more substrates with a spacer interposed therebetween. The plurality of substrates may have different shapes.

Figure 7:
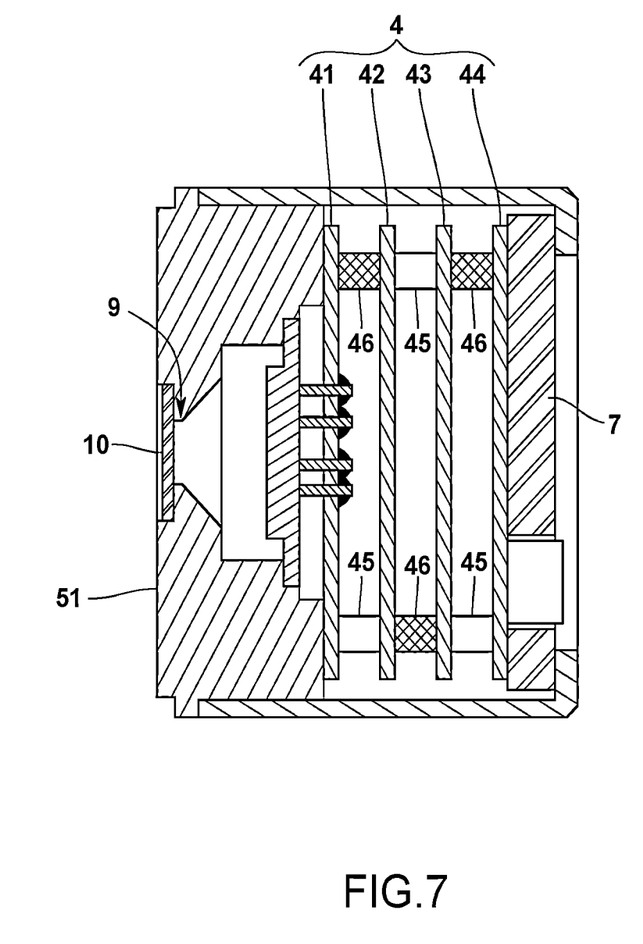
FIG. 7 is a cross-sectional view illustrating configurations of spacers and inter-substrate connectors in a signal processing unit of a modified embodiment.

In the above embodiment, in the substrates 41 to 44, the spacers 45 are arranged in a row and the inter-substrate connectors 46 are arranged in a row in the stacking direction of the substrates 41 to 44. However, as illustrated in FIG. 7, in the substrates 41 to 44, the spacers 45 and the inter-substrate connectors 46 may be alternately arranged in the stacking direction of the substrates 41 to 44. As illustrated in FIG. 7, the first substrate 41 may be fixed in direct contact with the first casing portion 51 without using the heat dissipation member 8. Even in this case, as shown in FIG. 4, it is possible to achieve an effect equivalent to or greater than that in the case of using the heat dissipation member 8.

In the above embodiment, the elastic member 7 is configured to press the plurality of substrates 41 to 44 from the direction in which the plurality of substrates 41 to 44 are stacked, but may be configured to press the plurality of substrates 41 to 44 from the periphery.

In the above embodiment, the heat dissipation member 8 is provided between the first casing portion 51 and the first substrate 41, but may be interposed between the third substrate 43 on which the temperature calculation unit (CPU) 4c is mounted and the first casing portion 51. Further, the heat dissipation member 8 may be interposed between each of the plurality of substrates 41 to 44 and the first casing portion 51.

In the above embodiment, the functions of the signal processing unit 4 are divided into four and distributed to the four substrates 41 to 44, but the number of substrates to which the four functions are decomposed is not limited to four. The method of distributing the functions of the signal processing unit 4 to the plurality of substrates is not limited to the above embodiment.

Furthermore, the casing 5 may be integrated without being separated into the first casing portion 51 and the second casing portion 52, or in the case where the casing 5 is separated into the first casing portion 51 and the second casing portion 52, a heat insulating member or a heat conduction member may be interposed therebetween.

Moreover, in the above embodiment, the lens block 521 is configured to be replaceable in the second casing portion 52, but the second casing portion 52 may be configured to be replaceable with respect to the first casing portion 51 so that the lens 3 can be replaced.

In addition, various modifications and combinations of the embodiments may be made without departing from the gist of the present invention.

INDUSTRIAL APPLICABILITY

According to the present invention, the radiation thermometer can be downsized and the circuit scale can be increased.

The invention claimed is:

1. A radiation thermometer comprising:
    an infrared sensor;
    a signal processing unit that processes a signal of the infrared sensor; and
    a casing that accommodates the infrared sensor and the signal processing unit,
    wherein the signal processing unit is configured by stacking a plurality of substrates with a spacer interposed therebetween,
    wherein the plurality of substrates are sandwiched from both sides, in a stacking direction of the substrates, by an elastic member and the casing, and
    wherein the plurality of substrates are pressed, directly or indirectly, against the casing by the elastic member through an elastic force, so as to fix the plurality of substrates to the casing.

2. The radiation thermometer according to claim 1, wherein the plurality of substrates are connected using an inter-substrate connector.

3. The radiation thermometer according to claim 1, wherein
    the plurality of substrates include a first substrate on which the infrared sensor is mounted, and
    the first substrate is provided in contact with the casing or provided with a heat dissipation member interposed between the first substrate and the casing.

4. The radiation thermometer according to claim 1, further comprising a lens provided in front of the infrared sensor, wherein the casing includes a first casing portion that accommodates the infrared sensor and the signal processing unit, and a second casing portion that accommodates the lens, and the first casing portion and the second casing portion are configured to be separable from each other.

5. The radiation thermometer according to claim 4, wherein the first casing portion includes a diaphragm portion that is provided in front of the infrared sensor and blocks heat radiation from the second casing portion.

6. The radiation thermometer according to claim 4, wherein the first casing portion includes a wavelength selection filter provided in front of the infrared sensor.

7. The radiation thermometer according to claim 4, wherein the second casing portion includes a lens block that holds the lens, and the lens block is configured to be replaceable.

* * * * *